Mar. 13, 1923.

A. R. WHITTALL.
CAN SOLDERING MACHINE.
FILED JULY 19, 1921.

Inventor
A. R. Whittall
By
Fetherstonhaugh & Co
Attorneys

Mar. 13, 1923.
A. R. WHITTALL.
CAN SOLDERING MACHINE.
FILED JULY 19, 1921.
1,448,099.
2 SHEETS—SHEET 2.
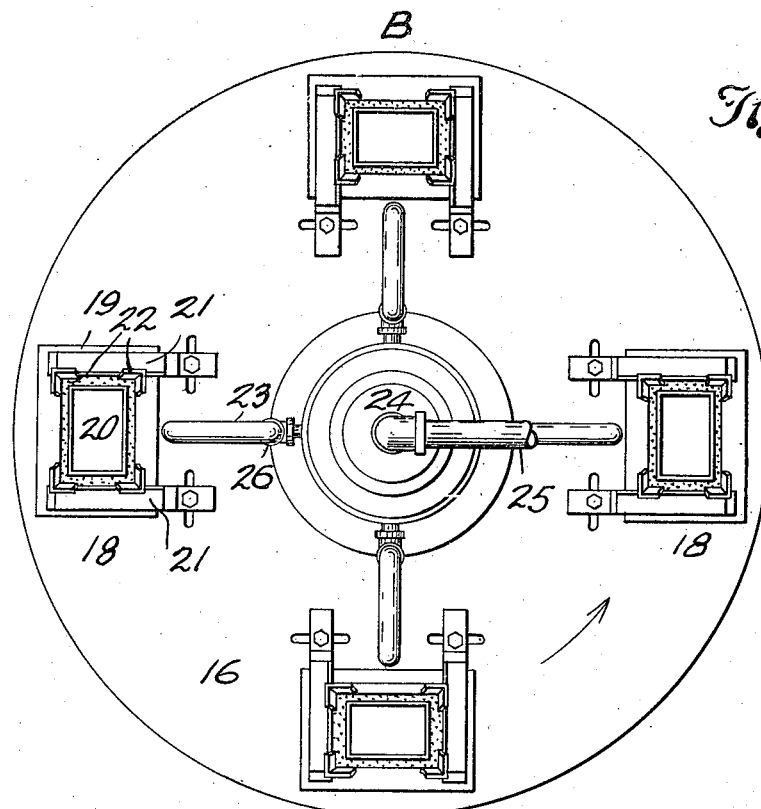
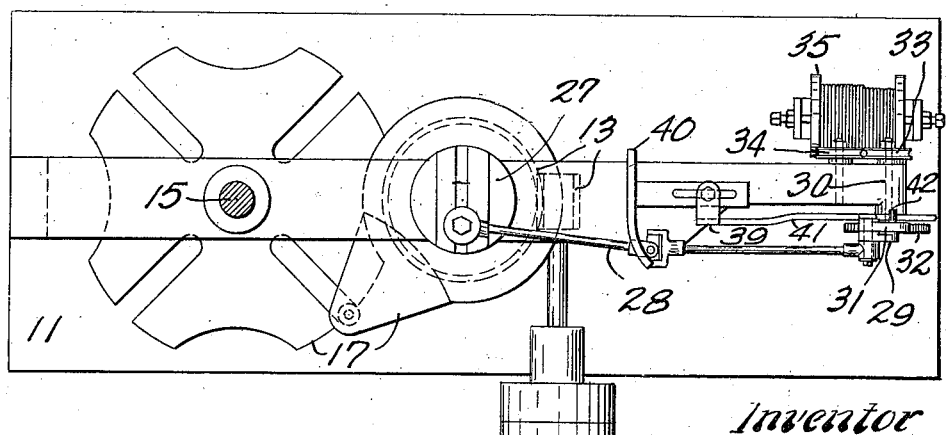
Inventor
A. R. Whittall Patented Mar. 13, 1923.

1,448,099

UNITED STATES PATENT OFFICE.

ALBERT RICHARD WHITTALL, OF MONTREAL, QUEBEC, CANADA.

CAN-SOLDERING MACHINE.

Application filed July 19, 1921. Serial No. 485,861.

*To all whom it may concern:*

Be it known that I, ALBERT RICHARD WHITTALL, a subject of the King of Great Britain, and resident of the city of Montreal, in the Province of Quebec and Dominion of Canada, have invented certain new and useful Improvements in Can-Soldering Machines, of which the following is a full, clear, and exact description.

This invention relates to improvements in can soldering machines, and the object of the invention is to provide a means for quickly and easily soldering the ends of cans.

For certain classes of goods, the manufacturers demand an absolutely tight container and yet object to solder on the outside of the container, as it spoils the appearance of same. Internal soldering, especially on rectangular cans, necessitates hand work.

In order to enable this hand soldering to be quickly and easily accomplished, the present invention provides a machine comprising a rotatable table with holders thereon for a plurality of cans, each of said holders being equipped with a heating device to heat the cans in them. A soldering pencil of material of low thermo conductivity is provided and is connected by means of a flexible conduit with a source of solder supply. A suitable feeding device is provided to rotate the table and thereby feed the cans to an operating point and at the same time to feed the proper amount of solder to the pencil, so that the operator has only to run the point of the pencil around the inside of the seam. The machine works automatically and at properly timed intervals to remove the soldered cans from the operating point and place fresh cans to be soldered, and at the same time to supply the proper amount of solder. The heating devices in the holders heat the cans during transit from a loading point to the operating point, so that the solder melts immediately on contact with the heated metal and becomes water thin during removal of the can from the operating point to an unloading point, so that it will flow into every crevice of the seam.

In the drawings which illustrate the invention;—

Fig. 2 is a plan view of the rotatable table and the holders.

Fig. 3 is a plan view of the table shifting and solder feeding mechanism.

Figure 1:
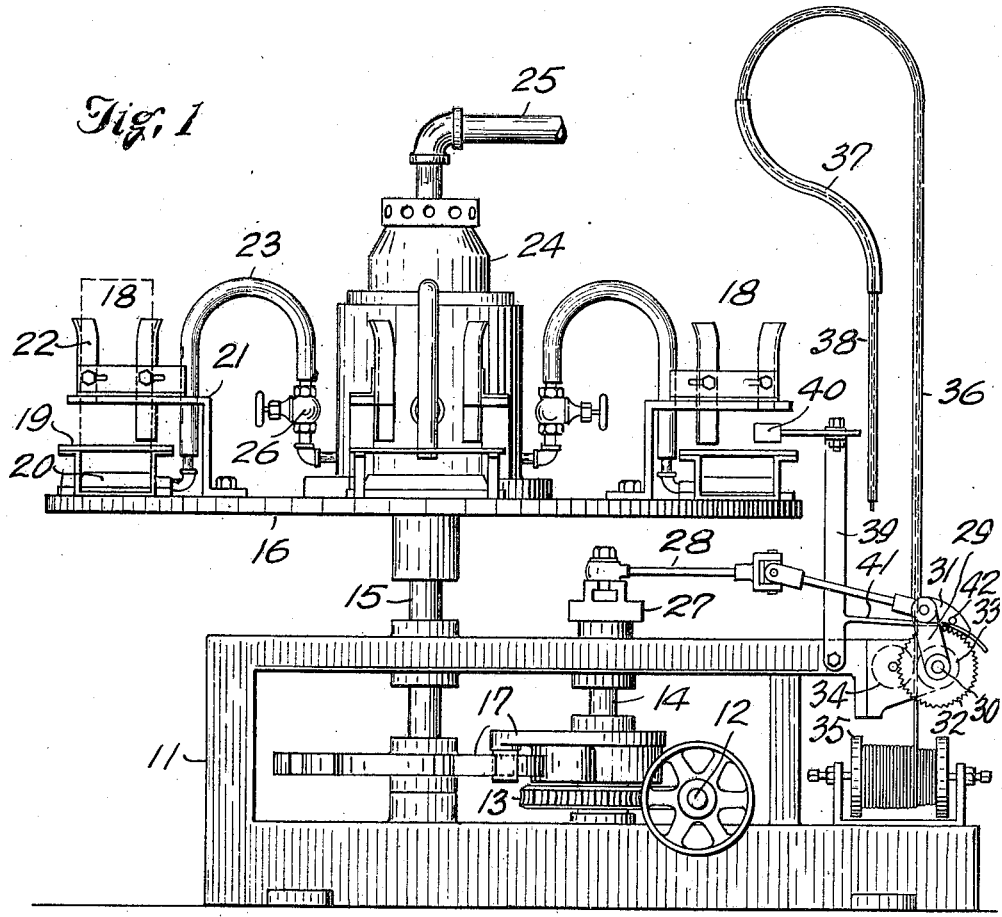
Fig. 1 is a side elevation of the device.

Referring more particularly to the drawings, 11 designates a base of any suitable shape upon which is journalled a driving shaft 12 connected by suitable gearing 13 to a timing shaft 14. A third shaft 15 is journalled in the base and serves to rotatably support a table 16. This shaft 15 is driven from the shaft 14 by any suitable means, such as a Geneva movement 17, so that the table 16 will be rotated in a step by step or integrating manner.

A plurality of can holders, each designated as a whole by the numeral 18, are mounted in equally spaced relation in a circular row on the table 16. Each holder comprises a suitably supported bottom frame 19, the shape, proportion and size of which depends entirely upon the shape, proportion and size of the cans to be soldered. As illustrated in the drawings, the holders are designed to support rectangular cans. Below each frame 19, there is provided a heating element 20 of any suitable type. Above the frame 19, a pair of brackets 21 or any equivalent construction is provided to support can guides 22, which are flared at their upper ends, as clearly shown in Figure 1. These guides are preferably adjustably mounted as are also the brackets. In the holders illustrated, which are designed for rectangular cans, the guides 22 are short lengths of angle iron, as illustrated, but it will be understood that the shape and number of these guides may be varied according to the cans to be operated on. The outer guides terminate at about the lower surface of the brackets, while the inner guides continue downwardly to approximately the level of the frames 19, as clearly shown. The object of this construction is to provide a clear space between the elements 19 and 21 for the entrance of a feeler.

In the drawings the heaters 20 are illustrated as gas heaters of any suitable construction and each supplied through a pipe 23. These pipes lead from a gas and air mixing device 24 disposed centrally of and upon the table and supplied with gas through a pipe 25 arranged in axial alignment with the shaft 15, so that when the table rotates the mixing device 24 will rotate around the mouth of the pipe. Each heater is preferably provided with an individual controlling device 26. The shaft 14 carries a diametrically slotted disc 27, to which one end of a pitman rod 28 is adjustably secured, so that by moving the end of the rod in the slot toward or away from the centre of the disc the stroke of the rod may be adjusted as desired. The opposite end of this rod is pivotally connected to and supported by a rocker 29 on a shaft 30. The rocker carries a pivotally mounted pawl 31 adapted to mesh with a toothed ratchet wheel 32 fixedly mounted on the shaft 30. A solder feed roll 33 is also fixedly mounted upon the shaft 30 and operates in conjunction with a second roll 34. The spacing between the two rolls is naturally such that solder wire or ribbon from a reel 35 will be gripped sufficiently tightly to be fed by revolution of the roll 33. A rigid conduit 36 extends from a point adjacent the rolls 30, 34 to a point directly over the path of the holders 18 and is then connected by a flexible conduit 37 with a short length of rigid conduit or pencil 38 composed of any suitable incombustible material having low heat conductivity. A lever 39 is pivoted at one end on the frame 11 and at the other end carries an adjustably mounted feeler 40 adapted to enter between a frame 19 and the brackets 21 above it and feel for a can in the holder. The lever 39 carries an arm 41 engaging a pin 42 on the pawl 31 and operating in the normal position of the lever 39 to hold the pawl out of mesh with the ratchet wheel 32.

The operation of the device is as follows:—Assuming the direction of table rotation to be as indicated by the arrow, Figure 2, the operating or soldering point is at A and the loading and unloading point somewhere in the vicinity of B or perhaps a little nearer to the point A. An operator standing at the point B receives from any suitable source a can body to which an end has been assembled and places the can body with the assembled end lowermost in the holder, thrusting it down so that the end rests preferably on the heater 20. The can is carried by rotation of the table through an angle of 270 or more degrees to the station A. At this station, another operator stands grasping the pencil 38. As soon as the table comes to rest, this operator runs the point of the pencil around the seam between the body and end of the can, so that a length of solder wire which has been previously projected from the pencil 38 is rubbed against the metal through the whole length of the seam. The time required for the transport of the can from station B to station A is sufficient to heat the metal of the can at the seam to a degree where the solder will melt immediately on contact with the metal. Thus, as the pencil passes over the seam, the solder is melted off and deposited on the seam. After a predetermined lapse of time, the machine automatically rotates the table to move away the soldered can and bring a fresh one to the station A. The operator at station B then removes the soldered can and places a fresh can in the holder. It will be understood that the can is quite hot when it reaches station A, so that between the application of the solder and the removal of the can from the holder the solder will be thoroughly melted and will run almost as freely as water, so that it will fill every crevice of the seam. The amount of solder fed should be previously guaged, so that only the proper amount is supplied, since if there is any surplus it will tend to run out of the seam and draw away from the seam liquid solder which would otherwise be held by the adhesion between the solder and the can and by the capillary action of the seam crevices. Obviously the table must be horizontal and the cans properly placed in the holders, so that they will be level. Otherwise, solder will tend to run to some one point.

The shaft 12 rotates continuously and drives the timing shaft 14 at a reduced speed. The Geneva movement 17 imparts an integrating motion to the shaft 15 and therefore to the table 16, thus producing the previously described alternation of movement and rest. As the shaft 14 rotates it produces reciprocation of the pitman 28 and oscillation of the rocker 29, so that the pawl 31 travels back and forth above the ratchet wheel 32. It is obvious that with the Geneva movement shown, the shaft 14 will make one revolution for each step of movement of the table 16, so that for each shift of the table the pawl 31 will be operated once. Normally, the pawl is held out of engagement with the ratchet wheel by the arm 41 and pin 42 and if, by any chance, there is no can in a holder this normal condition remains undisturbed. Whenever there is a can in the holder coming to the soldering station A, this can engages the filler 40 and presses it outwardly, thus oscillating the arm 39 and lowering the pawl into engagement with the ratchet wheel. When the machine is properly adjusted, this lowering occurs just as the pawl commences its travel in the feeding direction, with the result that the roll 33 is rotated a predetermined amount and a predetermined length of solder wire fed through the conduits 36 and 37 to the pencil 38. The amount of solder fed may be regulated by adjusting the position of the pitman on the slotted disc which operates it. This arrangement not only economizes in solder by preventing solder being fed when there is no can coming to the soldering station but also guards against a surplus amount of solder being supplied to any can.

While the apparatus has been described and illustrated in its most simple form, it will be understood that the invention is not limited to the precise instrumentalities employed but that modifications may be made in these. It will also be understood that the invention is not limited to the number of holders illustrated, as these may be increased as desired with a corresponding adjustment of the heating device or an increase in the number of soldering stations.

Having thus described my invention, what I claim is:—

1. A can soldering machine comprising a rotatable support, a plurality of can holders thereon, means for heating cans in the holders, a solder conduit comprising a stationary portion, a flexible portion connected thereto and a rigid tip portion or pencil for the flexible portion, means for rotating the support to move holders successively to the solder conduit, and means for feeding a predetermined amount of solder through the conduit substantially at the time each holder comes to the conduit.

2. A can soldering machine comprising a rotatable support, a plurality of can holders thereon, a heater in each holder, means for rotating the support, a soldering pencil, means for feeding solder thereto, and a feeler controlling the operation of the solder feeding means and disposed to relatively enter the holders in succession to feel for a can therein.

3. In a can soldering machine, a rotatable support, means for rotating the support, a plurality of can holders on the support each comprising a can rest, and adjustably mounted can guides, means for heating cans in the holders, a soldering pencil, and cam actuated means for feeding a predetermined amount of solder to the pencil as each can comes to a predetermined soldering point.

4. In a can soldering machine, a rotatable support, a plurality of can holders thereon, means for heating cans in the holders, a soldering pencil, means for feeding solder thereto, and operating means for the feeding means comprising a rotating shaft, a diametrically slotted disc thereon, a pitman connected to said disc at an adjustable point eccentric to the disc, a rocker operated by the pitman, and a pawl carried by said rocker adapted to operatively engage the solder feeding device.

5. In combination with a device according to claim 4, means normally holding said pawl out of engagement with the solder feeding device, and a can feeler adjustably mounted on said holding means to operate the holding means by can movement and effect operative connection of the solder feeding means and its operating means.

6. In a can soldering machine, a movable support, a plurality of can holders thereon, a pair of soldering feed rollers, a rigid solder conduit extending upwardly from said rollers and having its upper end directed laterally and downwardly to overlie the can holders, a flexible conduit connected to the upper end of said rigid conduit, a solder pencil secured to the free end of the flexible conduit and means for actuating said rollers to feed the solder to the pencil.

7. In a soldering machine, a movable support, a plurality of can holders thereon, a solder pencil, means for feeding solder to the pencil, means for operating said feeding means including a ball engaged therewith, and means for controlling said operating means including a pivoted arm, a feeler carried thereby adapted to be moved by engagement with a can in one of the holders, a pin carried by the ball and an extension from the pivoted lever engaging said pin and serving to hold the ball out of driving engagement with the feed mechanism except when the feeler is engaged and moved by a can.

In witness whereof, I have hereunto set my hand.

ALBERT RICHARD WHITTALL.